(12) United States Patent
Kallabis

(10) Patent No.: US 7,779,545 B2
(45) Date of Patent: Aug. 24, 2010

(54) SPIRIT LEVEL

(75) Inventor: Gabriel Kallabis, Spirkelbach (DE)

(73) Assignee: Stabila Messgerate Gustav Ullrich GmbH, Annweiler (DE)

( * ) Notice: Subject to any disclaimer, the term of this patent is extended or adjusted under 35 U.S.C. 154(b) by 37 days.

(21) Appl. No.: 12/273,116

(22) Filed: Nov. 18, 2008

(65) Prior Publication Data

US 2009/0139102 A1 Jun. 4, 2009

(30) Foreign Application Priority Data

Nov. 29, 2007 (DE) .................. 20 2007 000 049 U

(51) Int. Cl.
*G01C 9/32* (2006.01)
(52) U.S. Cl. ....................................... 33/379
(58) Field of Classification Search ............ 33/379, 33/389, 390
See application file for complete search history.

(56) References Cited

U.S. PATENT DOCUMENTS

| | | | | |
|---|---|---|---|---|
| 1,898,367 A * | 2/1933 | Heinze | ............. | 33/390 |
| 2,068,017 A * | 1/1937 | Given | ............. | 33/365 |
| 3,034,220 A * | 5/1962 | Fell | ............. | 33/390 |
| 3,673,696 A * | 7/1972 | Wasson | ............. | 33/348 |
| 3,871,109 A * | 3/1975 | Vaida | ............. | 33/379 |
| 4,860,459 A * | 8/1989 | Dengler | ............. | 33/379 |
| 5,007,176 A * | 4/1991 | Huang | ............. | 33/377 |
| 5,207,004 A * | 5/1993 | Gruetzmacher | ............. | 33/379 |
| 5,414,937 A * | 5/1995 | Denley | ............. | 33/379 |
| 7,263,778 B2 * | 9/2007 | Lang et al. | ............. | 33/379 |
| 2006/0037204 A1* | 2/2006 | Gruetzmacher | ............. | 33/379 |

FOREIGN PATENT DOCUMENTS

DE 19650683 6/1988
DE 19911798 9/2000

\* cited by examiner

*Primary Examiner*—Christopher W Fulton
(74) *Attorney, Agent, or Firm*—Dennison, Schultz & MacDonald

(57) ABSTRACT

The invention concerns a spirit level (10) including a base body (11), e.g., in the form of a hollow profile, as well as a bubble level vial (12), formed of a vial body (14) with enclosed cavity (16), preferably of barrel shape, the vial being secured in the base body by means of a holder (28). The cavity contains a liquid (18) with gas bubble (20) floating therein and the vial body has end face regions (32, 36) running transversely to the lengthwise axis of the cavity. In order to achieve a high contrast between the end of the bubble and the liquid, it is proposed that the vial body (14) be joined to the holder (28) by an intimate material connection in the at least one end face region (32, 36) and that the holder and/or the intimate material connection be contrast intensifying in the region of the at least one end face region.

15 Claims, 1 Drawing Sheet

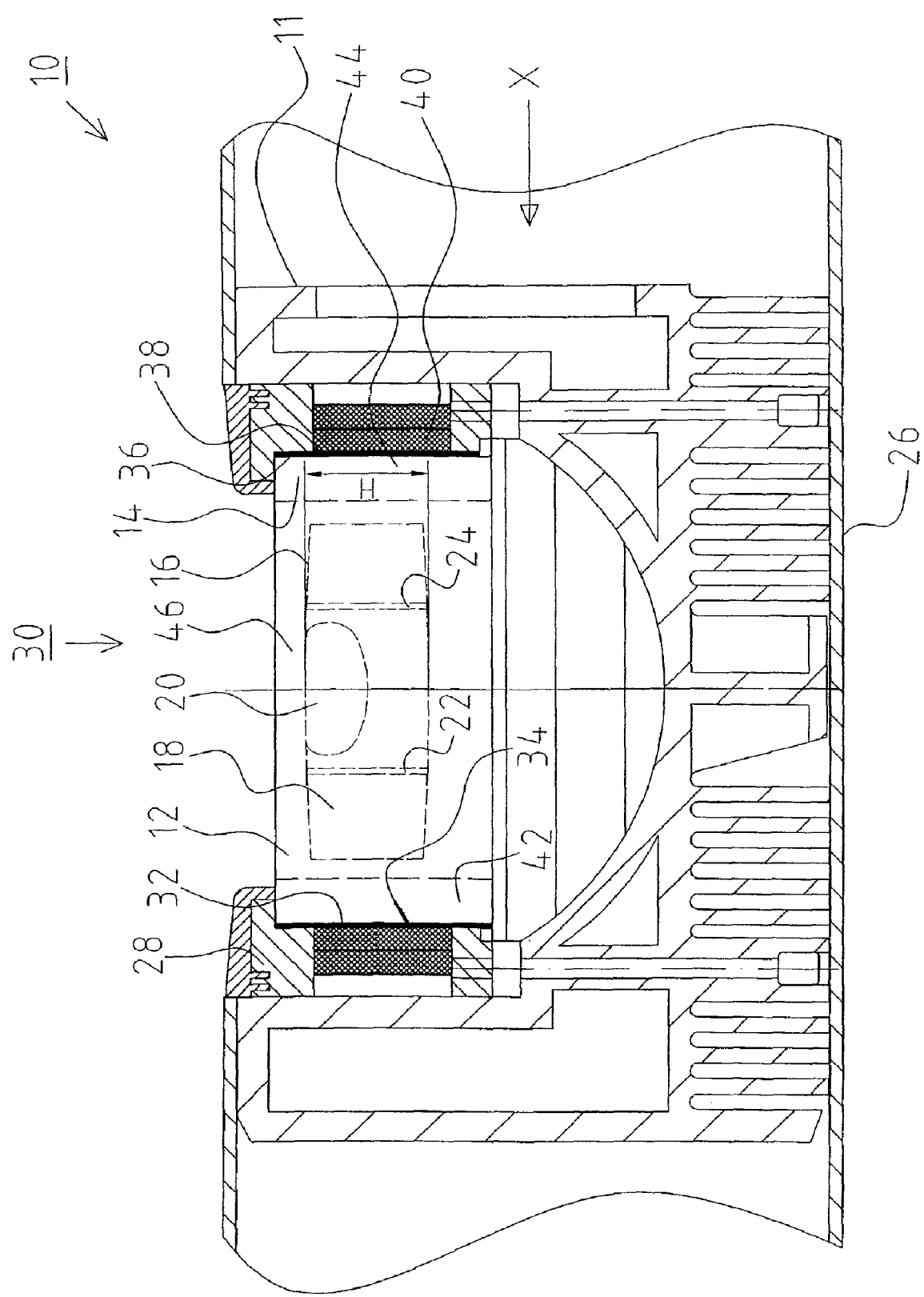

SPIRIT LEVEL

BACKGROUND OF THE INVENTION

The invention pertains to a spirit level, comprising a base body, e.g., in the form of a hollow profile, as well as a bubble level vial, consisting of a vial body with enclosed cavity, preferably of barrel shape, the vial being secured in the base body by means of a holder, while the cavity contains a liquid with gas bubble floating therein and the vial body has end face regions running transversely to the lengthwise axis of the cavity, and wherein measures are provided in at least one end face region to intensify the contrast between the gas bubble and the liquid.

Moreover, the invention refers to a vial for a leveling instrument, such as a spirit level. Finally, the invention pertains to a holder for a vial of a leveling instrument.

Spirit levels are used to check whether an object is horizontal or vertical, there being one or more bubble vials precisely oriented to one or more measuring surfaces in the base body. The vials adjusted exactly to the measuring base of the spirit level have an air bubble, whose position is to be determined with respect to at least two markings. Therefore, a good contrast should exist between the end of the bubble and the liquid. Often this is not possible when direct light, such as artificial light or sunlight, is striking the vial.

The vial body, usually of clear glass, can be fixed in the base body of the spirit level by a holder, preferably made of plastic.

Spirit levels can consist of an elongated base body in the shape of a hollow profile, such as one made of aluminum, whose open ends can be closed by impact-absorbing caps.

A spirit level is also known in which the vial body has encircling marking rings for intensified contrast. In addition, a coloration of the end faces can be done. Such measures, however, require special process steps, which are costly and time-consuming.

DE-A-196 50 683 pertains to a manufacturing method for a spirit level with hollow profile. In order to adjust and fix vial bodies in a spirit level body with high precision, a welding is done by laser. For this, it is proposed that the vial body made of transparent and nonreflecting plastic such as PMMA be welded to a vial frame consisting of a material such as ABS, in which laser beams are converted into melting heat.

In order to make possible a definite adjustment of a vial body according to DE-A-199 11 798, the latter is arranged in a vial holder.

SUMMARY OF THE INVENTION

The underlying problem of the present invention is to modify a spirit level of the kind mentioned at the outset so that a high contrast can be achieved between the end of the bubble and the liquid. Moreover a holder for a bubble vial should be modified so that a sufficient contrast exists between the gas bubble and the liquid even under unfavorable lighting conditions.

The problem is solved according to the invention for a spirit level of the kind mentioned at the outset in that the vial body is joined to the holder by an intimate material connection in the at least one end face region and the holder and/or the intimate material connection has a contrast intensifying configuration in the region of the at least one end face region.

In particular, it is provided that the at least one end face region has a light absorbing configuration and/or is provided with a light-absorbing medium. By light absorbing is meant that a shading of the vial bubble occurs so that is can be clearly recognized.

In particular, the invention provides that the at least one end face region is structured and/or colored to form an optically conspicuous contrast between gas bubble and liquid. Preferably, the at least one end face is dark colored, such as by blackening.

According to the invention, a spirit level with a bubble vial is proposed, where the region adjoining the vial body and running in prolongation of the cavity or its longitudinal axis is directly or indirectly optically configured so that a sufficient contrast when viewing is produced between the gas bubble and the liquid in the cavity, even when unfavorable optical conditions prevail.

Preferably, the invention provides that the holder and/or the intimate material connection is contrast intensifying over the entire or nearly the entire end face region.

In particular, the vial body has an intimate material connection to the holder in both end face regions, and the holder is structured and/or colored so that the optical contrast between the gas bubble and the liquid is intensified. In particular, the holder is dark colored, such as by blackening, in the at least one end face region or the end face regions.

Surprisingly, it has been found that a heightened contrast is also produced when not the end face region itself, but instead the holder receiving the vial body in the end face region or the intimate material connection, such as the adhesive itself, is contrast intensifying. Thanks to the intimate material connection, reflections between vial holder and vial body are avoided, which would otherwise result in a lower contrast.

In particular, the vial body is glued over its full surface to the vial holder by means of an adhesive in the end face regions. A welding of the holder to the vial body is likewise possible.

The cavity with the markings for orienting to the gas bubble is usually optically accessible via a recess present in the base body of the spirit level. Therefore, outside of the recess, the end face regions of the vial body can have a contrast intensifying configuration. Apart from this, the contrast intensifying region extends for a length above and below the cavity to an extent such that the contrast heightening effect can occur basically for any angle of viewing at which the gas bubble is observed.

At least, the contrast-intensifying end wall region should extend for a height that extends at least not more than the dimension of the cavity running transversely to the lengthwise axis of the cavity.

The holder can have a contrast intensifying configuration in the area of the at least one end face region between the gas bubble and the liquid, in particular, it can have a light absorbing configuration and/or be provided with a light absorbing medium, while preferably the region or the intimate material connection is dark colored, such as by blackening. Preferably, the vial body is in an intimate material connection with the holder for the entire end face region running transversely to the cavity.

BRIEF DESCRIPTION OF THE DRAWING

Further details, benefits and features of the invention will emerge not only from the claims and the features found therein—by themselves and/or in combinations—but also from the following description of a preferred sample embodiment, found in the sole drawing FIGURE, which shows in longitudinal cross section a portion of a spirit level according to the invention.

DESCRIPTION OF THE PREFERRED EMBODIMENT

The single FIGURE shows part of a longitudinal section of a spirit level 10 with mounted horizontal bubble vial 12. The vial 12 consists of a rectangular base body 14, preferably made of glass-clear acrylic glass, in whose lengthwise direction extends a cavity 16 having a barrel shaped geometry, in which a liquid 18 with air bubble 20 is contained. Moreover, two markings 22, 24 are present, passing around the periphery of the cavity 16 and between which the air bubble 20 needs to be oriented when the spirit level, i.e., the body 10 of the spirit level, is oriented with its measuring base 26 horizontal.

The vial 12, i.e., the vial body 14, is received in a holder 28 consisting preferably of plastic and joined to it by an intimate material connection. The holder is fixed in the base body 11, consisting preferably of a hollow profile such as an aluminum hollow profile. The cavity 18, which assigns the path of movement of the bubble, can be optically detected through a viewing window 30 bounded by the holder 28.

In order to achieve a sufficiently good optical contrast between the air bubble 20 and the liquid 18 even under unfavorable optical conditions, according to the invention the holder 28 and possibly also the vial body 14 is configured as follows.

Thus, in the image at left, the vial body 14 is dark colored in its end face 32 running transversely to the longitudinal axis of the cavity 16, such as by blackening (region 34), so that as compared to conventional bubble vials the contrast between the air bubble 20 and the liquid 18 is heightened. This can occur, first, by virtue of the reflection of light at the dark colored end face 32 and/or by the refraction of light, so that the dark colored end face 32 has an optical effect in the transitional region between air bubble 20 and liquid 18 and heightens the contrast when finding the air bubble.

The coloration of the end face or one of the end face regions 32 should extend over a height so that the region 32 is optically active at every angle of observation by which the air bubble 20 is detected. At least, the end face 32 should have a contrast intensifying configuration for a height that corresponds to the projection of maximum transverse dimension of the cavity 16, looking in the horizontal direction (X) of the drawing. This region is indicated by "H" in the drawing.

While the drawing shows only one end face region of the vial body 14 as contrast intensifying, i.e., dark in particular—such as black colored—one can also have both end face regions 32, 36 correspondingly contrast intensifying.

According to the invention, the contrast heightening effect from the holder 28 is achieved in that the vial body 14 is in an intimate material connection with the holder 28. This can be achieved by full-area gluing or welding to the holder 28 (region 38). Therefore, the region 40 of the holder 28 facing the end face region 36 has a contrast intensifying configuration, such as by being dark colored, in order to achieve the desired contrast heightening between gas bubble 20 and liquid 18. The extent of the contrast-heightening region of the holder 28 should correspond to what was explained in connection with the vial body 14. In addition or as an alternative, the intimate material connection itself, i.e., the adhesive, for example, can have a contrast-heightening configuration, such as by being colored.

It is also possible to have the vial body 14 in a multiple-piece design, with end segments 42, 44 being provided outside of the cavity 16, making possible the desired contrast heightening. Thus, the segment 46 of the vial body 14 that contains the cavity 18 can consist of the usual fully transparent material, while the end segments 42, 44 at the end faces can be dark—such as by being colored black.

If the end face regions 32, 36 and/or the regions 40 of the holder 28 facing them are configured according to the teaching of the invention, a coloration can be accomplished by spraying on, imprinting, or painting. Also, the corresponding regions can themselves be colored, without leaving the teaching of the invention.

Independently of the above, it is provided in particular that the contrast-heightening region extends across the entire end face region 32, 36 of the vial body 14, as also shown in principle by the single FIGURE.

The invention claimed is:

1. Spirit level comprising:
   a base body;
   a bubble level vial comprising a vial body having an enclosed cavity disposed along a longitudinal axis of the vial body and containing a liquid therein with a gas bubble floating therein, the vial body having end face regions running transversely to the longitudinal axis; and
   a holder for securing the vial in the base body,
   wherein the vial body is secured by a material-fitting connection to the holder in the at least one of said end face regions, and
   wherein at least one of the holder and the material-fitting connection between the holder and the vial body is contrast intensifying in a region of the at least one of the end face regions.

2. Spirit level as in claim 1, wherein the holder is dark colored in the region of material-fitting connection to the vial body.

3. Spirit level as in claim 1, wherein the vial body is joined to the holder by at least one of gluing and welding.

4. Spirit level as in claim 1, wherein the vial body has a multiple-part configuration, and vial body segments at the end faces are dark colored.

5. Spirit level as in claim 1, wherein at least one of the holder and the material-fitting connection between the holder and the vial body is contrast intensifying over substantially all of the at least one end face region.

6. In combination, a holder for a bubble level vial, and the vial comprising a vial body with enclosed cavity disposed along a longitudinal axis of the vial body and containing a liquid with a gas bubble floating therein, the vial body having end face regions running transversely to the longitudinal axis,
   wherein the vial body is joined by a material-fitting connection to the holder in at least one of the end face regions and the holder or the material-fitting connection between the holder and the vial body is contrast intensifying in a region of the at least one of the end face regions.

7. The combination as in claim 6, wherein the holder is dark colored in the region of material-fitting connection with the vial body.

8. The combination as in claim 6, wherein the material-fitting connection between the holder and the vial body is dark colored.

9. The combination as in claim 6, wherein the vial body is joined to the holder by gluing or welding.

10. The combination as in claim 6, wherein at least one of the holder and the material-fitting connection is contrast intensifying over substantially all of the at least one of the end face regions.

11. A holder for a bubble level vial comprising a vial body with enclosed cavity disposed along a longitudinal axis of the vial body and containing a liquid with air bubble floating therein, the vial body having end face regions running transversely to the longitudinal axis, the holder comprising a material-fitting connection to the vial body in at least one of the end face regions, the holder or the material-fitting connection between the holder and the vial body being contrast intensifying in at least one of the end face regions.

12. The holder as in claim 11, wherein the holder is dark colored in the region of material-fitting connection with the vial body.

13. The holder as in claim 11, wherein the material-fitting connection between the holder and the vial body is dark colored.

14. The holder as in claim 11, wherein the material fitting connection comprises glue or a weld.

15. The holder as in claim 11, wherein at least one of the holder and the material-fitting connection is contrast intensifying over substantially all of the at least one of the end face regions.

* * * * *